May 28, 1940. L. N. PELKEY 2,202,299
DENTAL POLISHING MACHINE
Filed Feb. 24, 1936
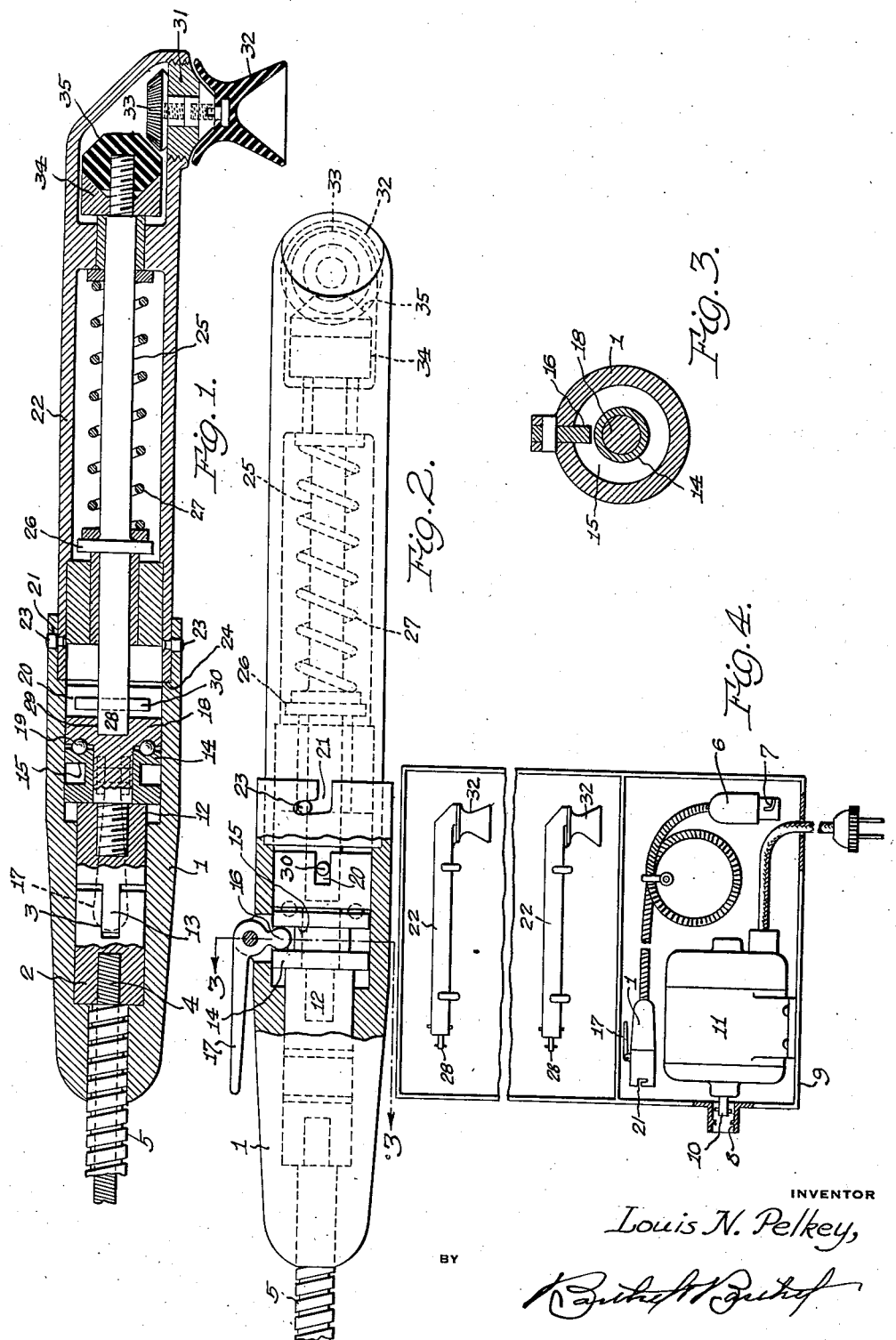
INVENTOR
Louis N. Pelkey,
BY
ATTORNEYS Patented May 28, 1940

2,202,299

UNITED STATES PATENT OFFICE 2,202,299

DENTAL POLISHING MACHINE

Louis N. Pelkey, Howell, Mich.

Application February 24, 1936, Serial No. 65,381

1 Claim. (Cl. 32—59)

The present invention relates to dental apparatus designed particularly for the purpose of cleaning and polishing teeth.

The primary object of the invention is to provide a power driven dental apparatus embodying means permitting the dental implements to be quickly and easily removed or interchanged so that the same power apparatus may be employed to operate various dental implements. The present device is thus adapted for domestic use inasmuch as the same power apparatus may be employed to operate the individual dental implements, such as brushes or polishing devices, of the various members of the family.

Another object of the present invention is to provide a dental apparatus including driving members and means for detachably connecting dental implements with such driving members, and in combination therewith control means separate from the driving members for permitting manual control of the operation of the dental implements.

Still another object of the present invention is to provide a dental apparatus including means for removably securing dental implements thereto, wherein the parts for receiving, supporting, operating and controlling the operation are of such compact nature that the entire mechanism may be housed in removably secured together casings of comparatively small dimensions, the removably secured together casings being secured together in a manner whereby there is very little danger of moisture entering the same, and the parts of the mechanism being so constructed that if in some manner water should happen to get into the casings the device would continue to function.

With the above and other ends in view the invention is more fully disclosed with reference to the accompanying drawing in which Figure 1 is a longitudinal section;

Fig. 2 is an elevation partly broken away, and in section;

Fig. 3 is a section taken on the line 3—3 of Fig. 2, and

Fig. 4 is a view illustrating a housing for the motor and the dental implements when they are not in use.

Like characters of reference are employed throughout to designate corresponding parts.

The numeral 1 designates a casing in which is rotatably supported a driving element 2 having a slot 3 formed in one end thereof and having its other end permanently connected to a flexible drive cable 4. The cable 4 is enclosed within a flexible sheath 5 having a fitting 6 at its other end provided with a bayonet slot 7 whereby it may be removably connected to a tubular element 8 on a motor housing 9. The fitting 6 encloses a driving element, not shown, which is adapted to automatically establish a driving connection between the flexible shaft 4 and a motor shaft 10 of an electric motor 11 when the fitting 6 is connected to the tubular element 8.

The casing 1 is mounted on a rotatable element 12 having a projecting tongue 13 normally extending into the groove 3 in the rotatable element 2. Secured to the element 12 is a collar 14 having a groove 15 into the end 16 of which a lever 17 projects. The collar 14 is attached to the element 12 by means of a fitting 18 so arranged as to permit rotation of the collar with respect to the element 12 and the fitting 18. Anti-friction thrust bearings 19 are preferably interposed between the collar 14 and the fitting 18 and the outer end of the fitting 18 is provided with a slot 20.

Adjacent to its open end the casing 1 is provided with a pair of diametrically opposed bayonet slots 21 and a casing 22 is provided with pins 23 adapted to extend into the bayonet slots 21 to attach the two casings together. The bayonet slots are so disposed that the end of the casing 22 seats against a shoulder 24 within the casing 1 to provide a seal against moisture entering the two casings. Within the casing 22 is rotatably journaled a shaft 25 having a fixed collar 26 thereon against which a spring 27 acts to normally urge lengthwise movement of the shaft 25, so that its end 28 projects into a pilot bore 29 in the fitting 18 to dispose a diametrically disposed pin 30 carried thereby within the slot 20.

On the outer end of the casing 22 is provided a removable element 31 rotatably supporting a dental implement 32 and having a beveled gear 33 connected therewith and disposed within the casing 22. On the end of the shaft adjacent to the gear 33 is fixed a head 34 supporting a resilient member 35, preferably formed of rubber, and having its end beveled for engagement with the gear 33. The spring 27 normally holds the shaft 25 in a position where the element 35 is slightly spaced from the beveled surface of the gear 33.

In operation, assuming that the shaft 4 is rotated, the element 2 rotates therewith and due to the driving connection between the slot 3 and tongue 13 the rotatable element and fitting 18 are also caused to rotate. The end of the shaft 25 supports the pin 30 within the slot 20 in the fitting 18 and therefore rotative movement is transmitted from the fitting 18 to the shaft 25. Due to the fact that the resilient element 35 is normally out of engagement with the gear 33 the dental implement 32 remains stationary. In order to operate the dental implement 32 manual pressure is applied upon the lever 17 whereby the same rocks and moves the collar 14 to impart lengthwise movement thereto and also lengthwise movement to the shaft 25 against the opposition of the spring 27. Lengthwise movement of the shaft 25 carries a resilient element 35 into engagement with the gear 33 and a frictional driving connection is thus established between the shaft 25 and the dental implement 32.

It will thus be seen that the operation of the dental implement 32 may be controlled at a point remote from the motor 11 and that the casing 22 may be readily removed from the casing 1 in order to permit the driving mechanism enclosed in such casing to operate other dental implements. It will also be seen that there is very little danger of liquid gaining entrance to the casings 1 and 22 and that the parts are so constructed that they may be formed into a very compact device.

Although a specific embodiment of the present invention has been illustrated and described it will be understood that various changes may be made within the scope of the appended claim without departing from the spirit of the invention and such changes are contemplated.

What I claim is:

In apparatus of the character described, a pair of casing sections releasably attached together, rotatable drive means in one of said casing sections, rotatable drive means in the other of said casing sections and operatively connected to said first-named drive means, a driven member rotatable about an axis transverse to the axis of said last-named drive means, said second-named drive means being readily disengaged from said first-named drive means upon detaching said casing sections, said second-named drive means being bodily movable from an inactive position to an active position to drive a tool, manually operable means carried by said one casing section and operable to move said second-named drive means to its active position, and means operable to return said second-named drive means to its inactive position.

LOUIS N. PELKEY.